United States Patent
Payton et al.

(10) Patent No.: US 6,173,067 B1
(45) Date of Patent: Jan. 9, 2001

(54) SYSTEM AND METHOD FOR RAPID DETERMINATION OF VISIBILITY-BASED TERRAIN PROPERTIES OVER BROAD REGIONS

(75) Inventors: David W. Payton, Woodland Hills, CA (US); David M. Keirsey, Aurora, CO (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/061,356

(22) Filed: Apr. 7, 1998

(51) Int. Cl.[7] .................................................. G06K 9/00
(52) U.S. Cl. ......................... 382/106; 382/113; 382/154
(58) Field of Search ................................... 382/113, 103, 382/106, 154; 455/456, 457

(56) References Cited

U.S. PATENT DOCUMENTS

| | | | |
|---|---|---|---|
| 5,086,396 | * | 2/1992 | Warusezewski, Jr. ................ 364/454 |
| 5,140,532 | * | 8/1992 | Beckwith, Jr. et al. .............. 395/101 |
| 5,307,510 | * | 4/1994 | Gunmar et al. ...................... 455/67.1 |
| 5,355,442 | * | 10/1994 | Palieroni et al. ..................... 395/127 |
| 5,491,644 | * | 2/1996 | Pickering et al. ................ 364/514 R |
| 5,504,686 | * | 4/1996 | Lippitt et al. ......................... 364/444 |
| 5,710,758 | * | 1/1998 | Soliman et al. ...................... 370/241 |
| 5,787,350 | * | 7/1998 | Van Der Vorm et al. ........... 455/446 |
| 5,963,867 | * | 10/1999 | Reynolds et al. .................... 455/457 |

OTHER PUBLICATIONS

Asseo, S.J., "Terrain following terrain avoidance path optimization using the method of steepest descent", Proc. IEEE aerospace and Electronics Conf., May 27, 1988.*

Holmes, "Visual reply to map–related queries–a–free space graph approach", IEEE workshop on Visual Languages, Oct. 6, 1989.*

Hoffmeyer, J.A., "Measurement, modeling, and simulation of digital LOS microwave channels with applications to outage prediction", IEEE Trans. on Communications, Sep. 1991, Gale, D. J. et al., "Path length analyzer for digital microwave radio", Proceed.*

Gale, D. J. et al., "Path length analyzer for digital microwave radio", Proceedings COSMIG 88, Jun. 24, 1988.*

Brook, T. et al., "Propagation measurements using synthetic aperture radar techniques", IEEE Vehicular Technology Conf., May 1, 1996.*

\* cited by examiner

*Primary Examiner*—Amelia Au
*Assistant Examiner*—Martin Miller
(74) *Attorney, Agent, or Firm*—V. D. Duraiswamy; M. W. Sales (57) ABSTRACT

A system and method for rapidly obtaining information about the suitability of terrain to meet concealment or visibility objectives, such as might be needed for military planning or for determining placement of relay antennas in a cellular communication system, is disclosed. The disclosed system precomputes heuristic visibility fields for a geographic area, then uses the precomputed heuristic visibility fields to rapidly determine points on a map that will provide the desired characteristics of exposure or concealment in response to a query.

18 Claims, 6 Drawing Sheets

SYSTEM AND METHOD FOR RAPID DETERMINATION OF VISIBILITY-BASED TERRAIN PROPERTIES OVER BROAD REGIONS

BACKGROUND OF THE INVENTION (a) Field of the Invention

The present invention pertains to terrain analysis and, more particularly, to a method for rapidly determining visibility features of broad geographic regions.

(b) Description of Related Art

There are numerous applications for a system capable of rapidly characterizing the visibility features of broad geographic regions. Rapid characterization of the visibility features of a geographic area lends itself to many military applications. For example, a military commander would be able to query a terrain characterization system to find all regions which have east visibility and north concealment. A terrain characterization system would generate a map that illustrates such areas for the commander. Using such a map would allow the positioning of military reconnaissance forces to the west of an enemy camp while avoiding visual exposure to military forces to the north.

One civilian application of a terrain characterization system is that of determining placements for wireless and/or cellular base stations. In many cases, the line-of-sight visibility from a transmitting tower to a service area must be determined. The determination of line-of-sight visibility between two points is relatively simple, and can be done by analyzing a digital elevation map. A digital elevation map is a topographical map on which a grid is overlaid. Each cell of the grid contains a number representative of the elevation of that cell. To have line of sight visibility between two points, the area between the two points must not go above a straight line extended between the points. Although the actual task of determining area coverage (i.e., how much of an area is visible and how much of an area is concealed) once a proposed base station location has been chosen is generally rather simple, the task of actually choosing a particular base station location is very time consuming when using this trial and error basis.

It is possible to determine the regions visible from a single point through the use of a ray trace fan. A typical ray trace involves first reading an elevation value at a given grid square on a digital elevation map. From that grid square, in each direction, any point below the level of a ray from the grid square is marked as being non-visible. If the elevation value of a point is above the level of the ray, the point is marked as being visible and the angle of the ray is increased to match the elevation of the point. This method allows for the calculation of visible and concealed areas from the chosen point. By repeating this process using each grid square as a starting point, the visibility of an entire region may be determined.

The magnitude of calculations that must be made to determine the visibility of each point in all directions using ray trace procedures can be readily appreciated. Known terrain analysis systems perform all necessary calculations each time the system is used or a query is requested. This creates large computation overhead and, accordingly, a need for large computational power. Therefore, it would be desirable to perform computer terrain analysis of visible and concealed regions in a rapid and computationally efficient manner. Additionally, it would be desirable to provide a terrain analysis system capable of responding to queries regarding various visibility and concealment criteria in a compact unit.

SUMMARY OF THE INVENTION

The present invention is a system and method that performs rapid and computationally efficient computer terrain analysis of visible and concealed regions. One aspect of the present invention is embodied in a method for determining and representing the visibility of a point on a map. The method includes the steps of counting all cells visible from a point on the map in given directions, calculating a heuristic visibility number based on the count of the visible cells in the given directions, representing the visibility of the points on the map in the given directions with the heuristic visibility numbers and storing the heuristic visibility numbers in a database.

A second aspect of the present invention is embodied in a method for determining appropriate geographical locations based on a query from a user specifying desired terrain characteristics. The method includes the steps of accepting an input specifying desired terrain characteristics from the user, recalling previously stored terrain characteristic information from a database, and performing calculations using the previously stored terrain characteristic information, the calculations yielding a set of geographical locations matching the specified desired terrain characteristics.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
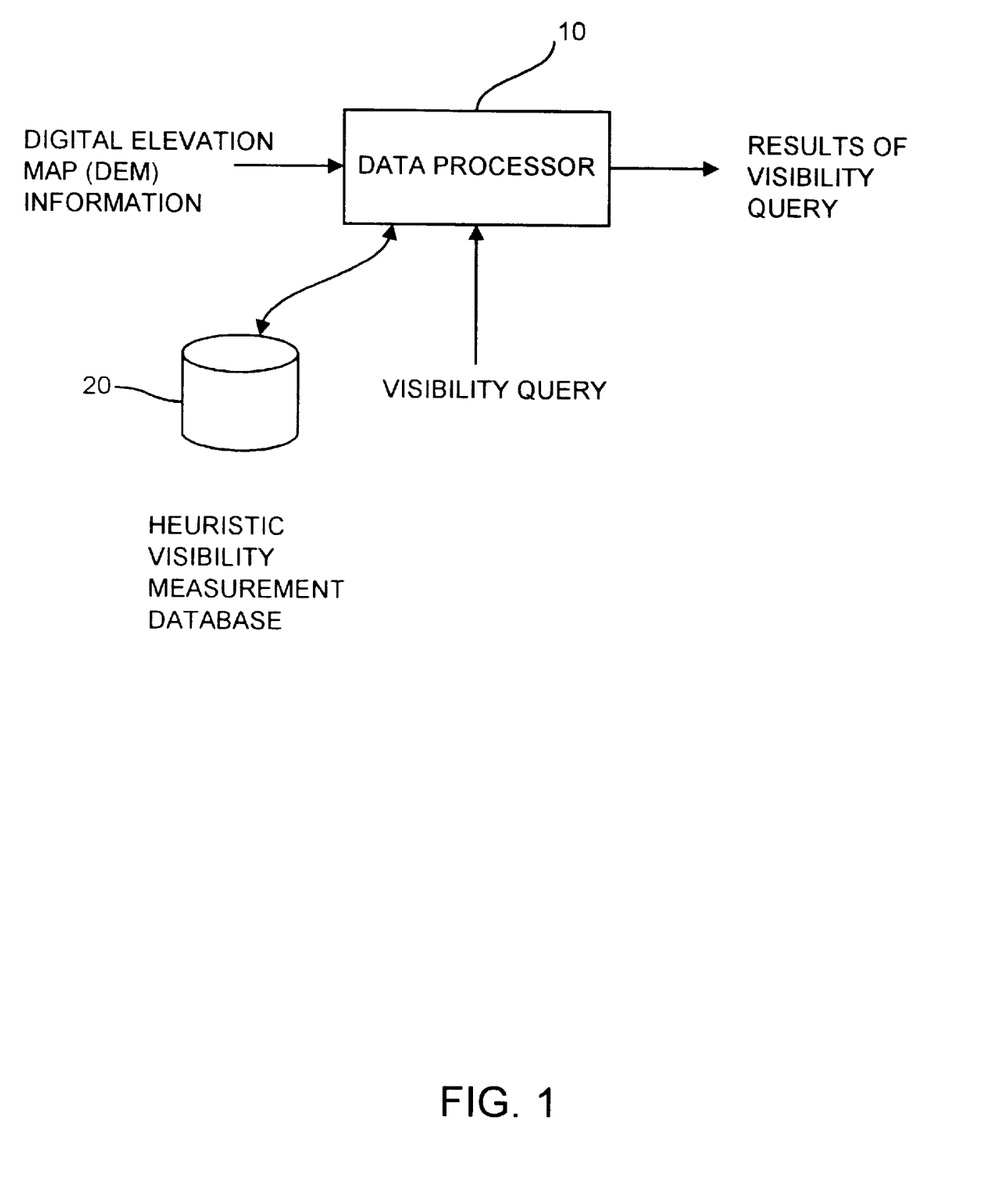
FIG. 1 illustrates a hardware system embodying the present invention.

Referring now to FIG. 1, a hardware system embodying the present invention is shown. The system includes, primarily, a data processor 10. The data processor 10 may be embodied as a computer workstation, a microprocessor, or a digital signal processor (DSP). The data processor 10 has three inputs, specifically: digital elevation map (DEM) information, a heuristic visibility measurement database 20, and a visibility query from a user. The DEM information is available from a number of sources including satellite systems that generate elevation maps, and currently known topographical maps stored in a database format. The data processor 10 converts the DEM information into a set of new maps containing heuristic visibility measures. The heuristic visibility measurement database 20 stores these calculated heuristic visibility measurements. These measurements may be combined in a manner disclosed herein in response to visibility queries. The database 20 may be a computer hard drive or other mass storage device containing information relevant to heuristic visibility calculations. The visibility query is provided by the system user who enters visibility criteria based on his/her needs for visibility and concealment. The stored heuristic visibility maps are then used to generate rapid responses to user queries. The results from the visibility query may be tabular data output, or gray scale or color maps indicating locations that meet the visibility criteria entered. The data processor 10 is responsible for the execution of software representing the functionality of FIGS. 2 and 6.

Figure 2:
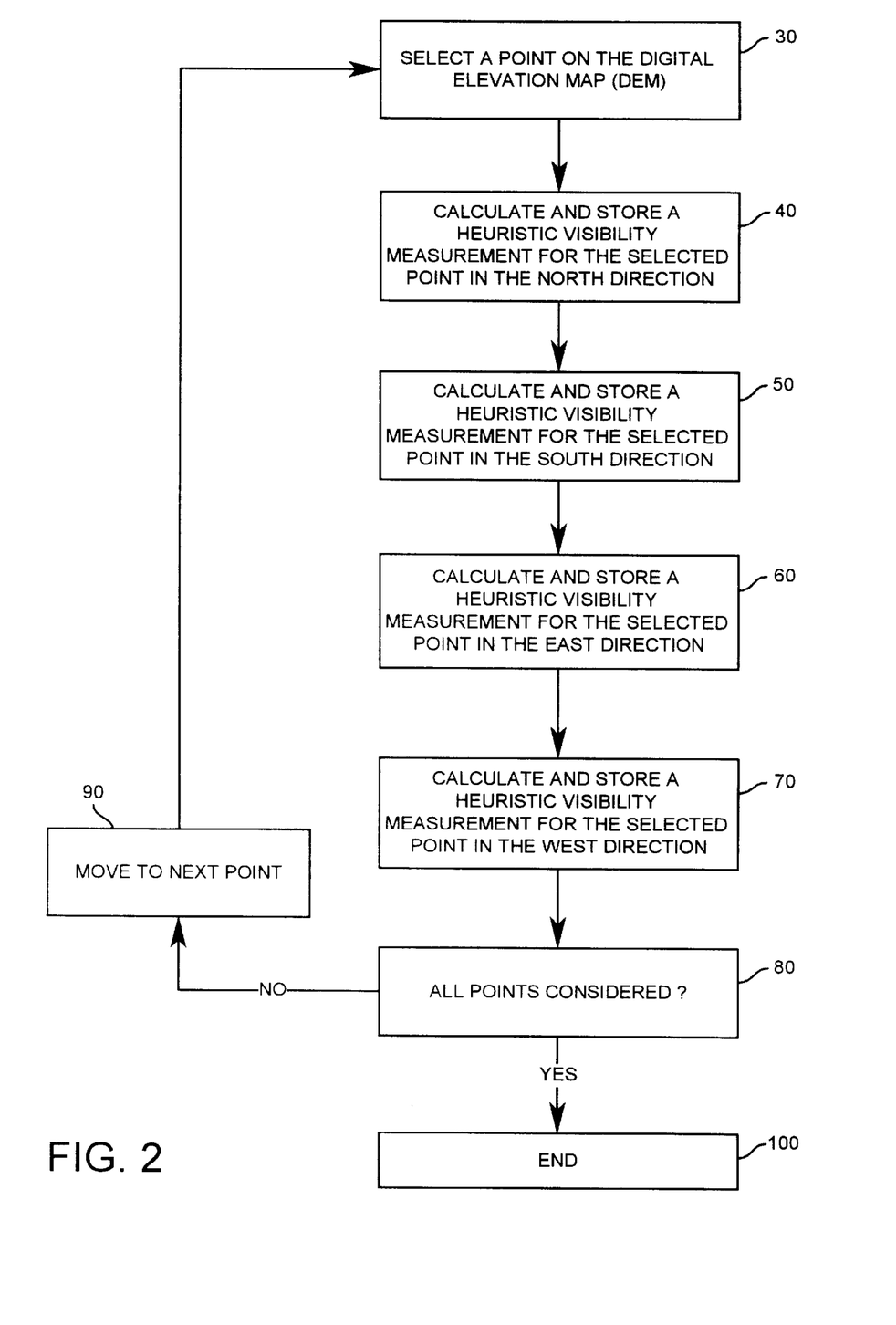
FIG. 2 is a flow diagram representing the process of generating heuristic visibility measures, according to the present invention.
Figure 3:
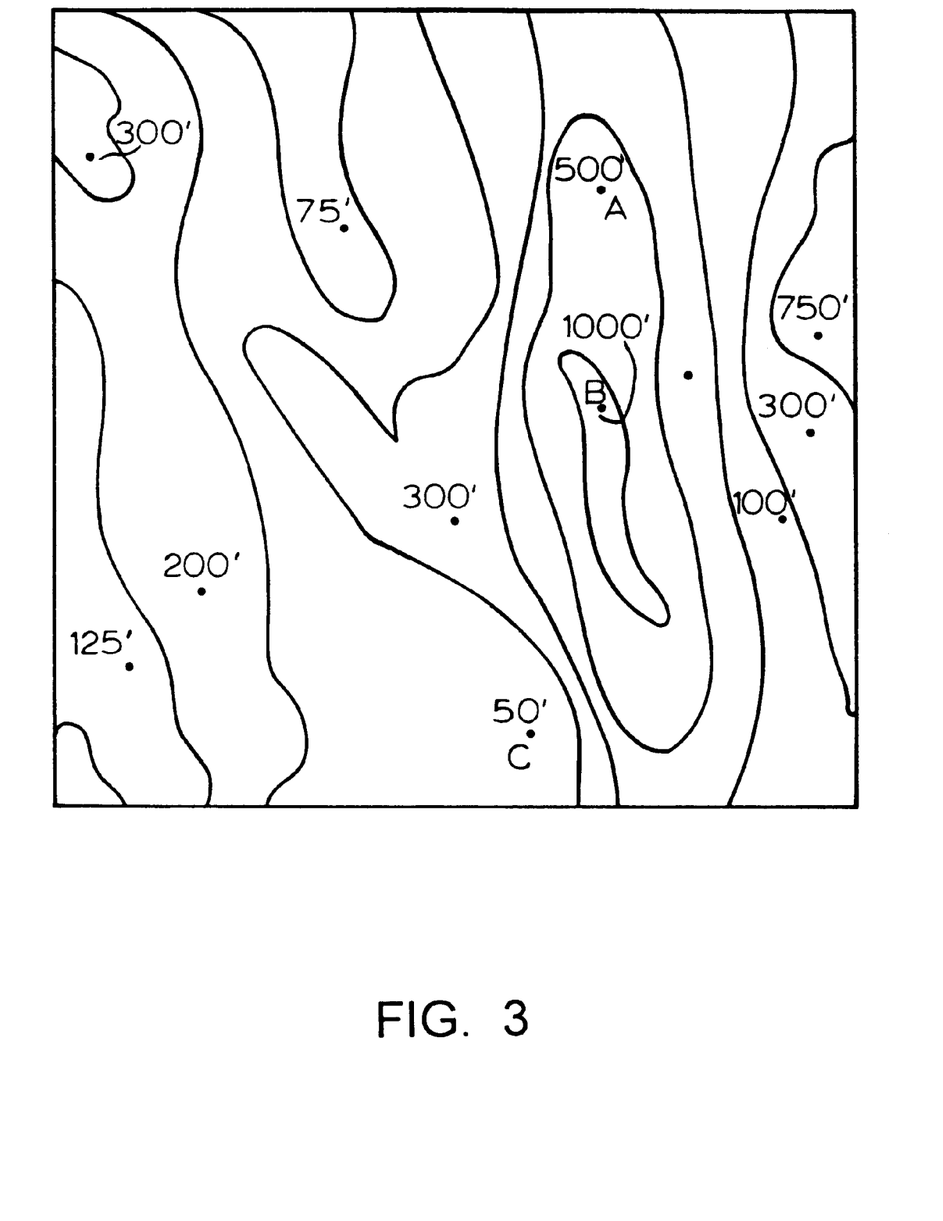
FIG. 3 is a digital elevation map representing elevations at various cells of the map.

A flow diagram representing the process of generating heuristic visibility measures, according to the present invention, is shown in FIG. 2. The process as shown in FIG. 2 will be explained with respect to digital elevation maps shown in FIGS. 3–5. The execution of software embodying the functionality of FIGS. 2 and 6 is carried out by the data processor 10 (FIG. 1). At block 30 a point on the digital elevation map is selected, as represented by points A, B, and C in FIG. 3. In FIG. 3, a digital elevation map is shown wherein the elevation of selected points is denoted on the map. An actual digital elevation map includes numbers representing the elevation of each cell. For the sake of clarity, elevations are shown for only a small number of cells in FIG. 3. After block 30 selects a point on the digital elevation map, a block 40 calculates and stores a heuristic visibility measurement for the selected point in the north direction. The information need to perform heuristic measurements may be stored in the database 20 shown in FIG. 1. Blocks 50, 60, and 70 perform substantially the same function as block 40, however, blocks 50, 60, and 70 calculate and store heuristic visibility measurements for the selected point in the south, east, and west directions, respectively. Although FIG. 2 is illustrative of a system which only considers visibility in four directions, heuristic visibility measurements could be made in any number of directions. For example, in a situation where very fine resolution is required, each point selected by block 30 may have a heuristic visibility measurement made in each of the 360° surrounding the particular point. However, the finer resolution used in the directions of the heuristic visibility measurement, the greater the computational overhead.

The heuristic visibility measurement represents the area of visibility from a given point as a percentage of the total area that could possibly be visible from that point. That is, the heuristic visibility number of a point may be represented by the ratio of visible area to the total of the visible area and the concealed area. One technique for computing the heuristic visibility number is to compute a ray trace fan from a selected point P in the digital elevation map. Note that the ray trace fan from point P extends in a specified set of directions. Equation (1) is a typical example of a equation that may be used to calculate a heuristic visibility number.

$$H(x, y) = \frac{\sum_\theta \sum_\rho F(\theta, \rho, P(x, y))}{\sum_\theta \sum_\rho S(\rho)} \quad (1)$$

H (x, y) is the heuristic visibility number for specified point on the digital elevation map specified by x, y. S($\rho$) is a factor representing the total area that could possibly be viewed from point (x,y). $\theta$ is the angle over which the ray trace fan is made, and $\rho$ is the radial distance from point P. Examples of typical functions that may be inserted into equation (1) are shown in equations (2) and 3.

$$F(\theta, \rho, P(x, y)) = V\sqrt{\frac{1}{\rho^\beta}} \quad (2)$$

$$S(\rho) = \sqrt{\frac{1}{\rho^\beta}} \quad (3)$$

Thus, if a specified point is at ($\theta$, $\rho$) is visible from point P, then V=1 otherwise V=0. $\rho$ is the radial distance from P and $\theta$ is the angular direction from P, and x and y are the Cartesian coordinates of point P.

Figure 4:
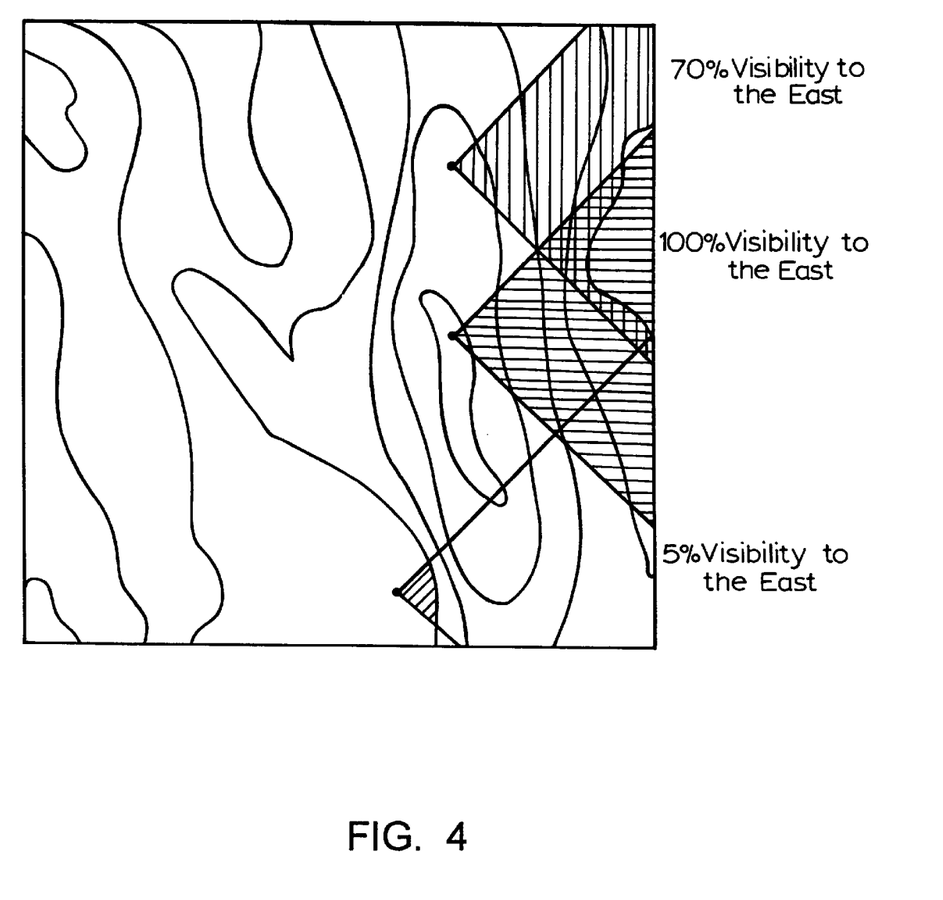
FIG. 4 is a representation of a digital elevation map used to calculate visibility to the east for 3 points, according to the present invention.

FIG. 4 represents how heuristic visibility numbers may be calculated for 3 points of the digital elevation map. Each of the 3 points is being analyzed to generate a heuristic visibility number representative of the visibility of that particular point in the east direction. For this particular example, point A's visibility cone is swept through 90°, wherein the center of the cone points directly eastward. Note that the visibility cone associated with point A covers all areas within the cone except for points wherein a region lies between the considered point and point A, wherein the region is higher than a line drawn from point A to the point considered. The ratio of visible to visible and concealed areas yields that the visibility to the east of point A is approximately 70%. Point B is likewise swept through a 90° angle, the center of which points directly eastward. Note that from FIG. 2, point B is the highest point on the map. Therefore, the visibility cone of point B yields 100% visibility to the east. That is, from the perspective of point B every point within the cone is visible, and point B is visible from every point within the cone. Like points A and B, point C is also swept through 90° the center of which is pointing directly eastward. However, the visibility of point C to the east is only 5% due to the 300' elevation blocking the terrain to the east. Note that the same process performed in connection with as by points A, B, and C would be duplicated for every point in the digital elevation map. This process yields a heuristic visibility number for the eastward direction for every point in the digital elevation map. For eastward visibility, equation (4) may be representative of an equation used to calculate a heuristic visibility number.

$$H(x, y)_{vis=east} = \frac{\sum_{\theta=315°}^{45°} \sum_\rho F(\theta, \rho, P(x, y))}{\sum_{\theta=315°}^{45°} \sum_\rho S(\rho)} \quad (4)$$

Note that the angle swept out in $\theta$ ranges from 315° to 45°.

Returning now to FIG. 1, a block 80 determines whether all points of a digital elevation map have been considered in the calculation of the heuristic visibility measurement. If all points have not been considered, block 80 transfers control to block 90, which selects the next point to be considered. Block 90, in turn, initiates the execution of block 30 which selects another point in the digital elevation map for calculation. If all points have been considered, block 80 passes control to block 100 which ends the current process.

Figure 5:
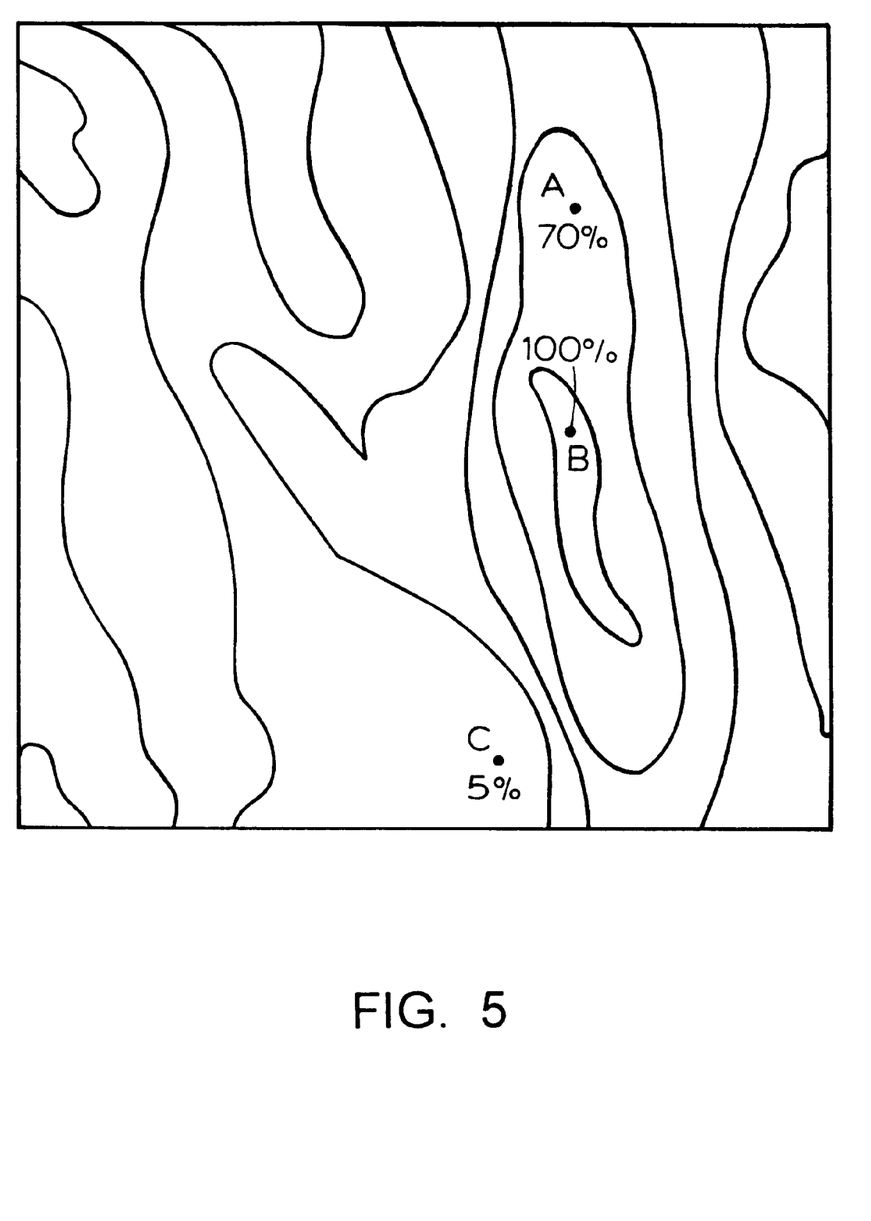
FIG. 5 is a representation of a digital elevation map indicating heuristic visibility measures to the east for 3 specific points, according to the present invention.
Figure 6:
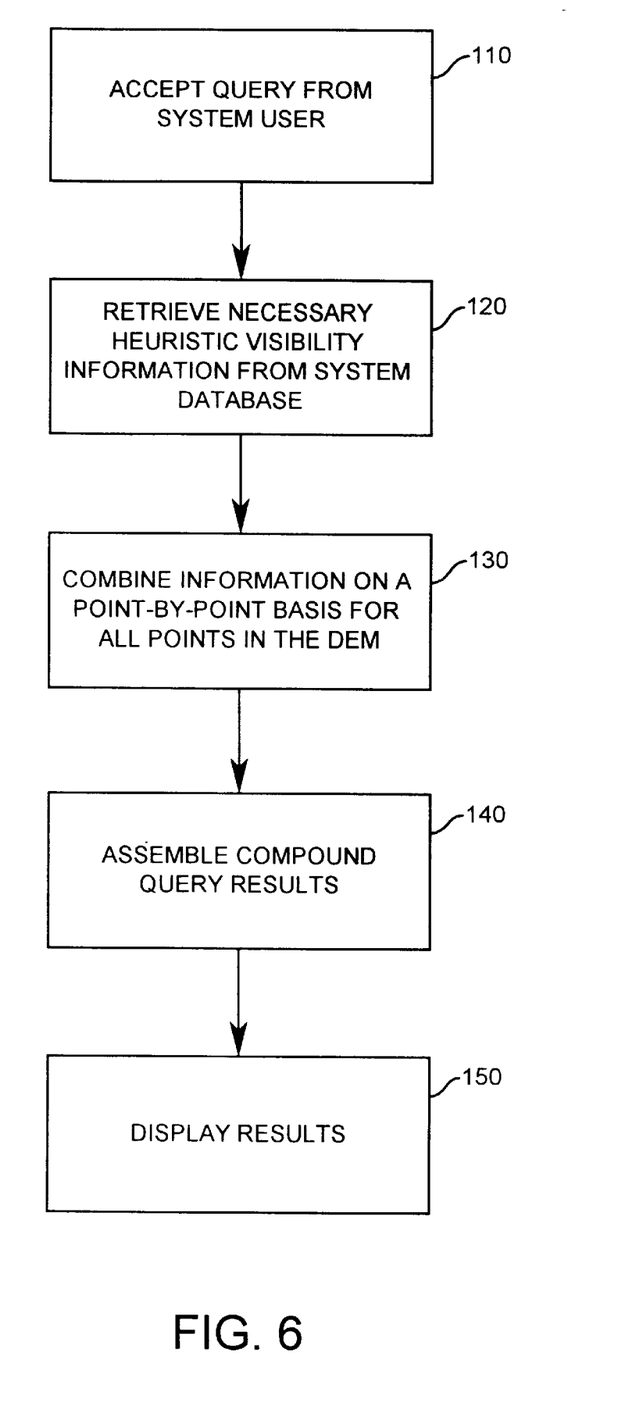
FIG. 6 is a flow diagram representing the process of combining heuristic visibility measures in response to query, according to the present invention.

After the heuristic visibility numbers have been calculated for every cell in the digital elevation map, the numbers representative of the heuristic visibility to the east are transferred to a map similar to the digital elevation map, as shown in FIG. 5. Instead of each cell on the map in FIG. 5 showing a digital elevation, each point will show a heuristic visibility number for the eastward direction.

The process as illustrated using eastward direction is duplicated for the north, south, and west directions through the process shown in FIG. 2. Alternatively, the angle swept out by the visibility cones may be reduced and additional visibility directions may be added. For example, north, south, east, and west directions may be only swept through 45° angles and northwest, northeast, southwest, and southeast heuristic visibility numbers may be swept out with cones centered in those directions sweeping through 45° thus, yielding 360° coverage about each point.

As heuristic visibility numbers are calculated for every cell on the digital elevation map in every direction, the numbers are stored in the database 20, shown in FIG. 1. These precalculated and stored data will be used to answer queries as to visibility and concealment requirements. For example, suppose that Vn is a map of heuristic visibility to the North and Vw is a map of heuristic visibility to the West. If a user wants a new heuristic visibility map of points that are visible to the North-West, equation (5) represents the calculation used by the present invention $$V_{northwest} = Vn \text{ or } Vw = (Vn(x,y) + Vw(x,y))/2 \quad (5)$$

Similarly, if a query is entered requesting visibility to the North and to the West, a calculation represented by equation (6) is used.

$$V \text{ north and west} = Vn \text{ and } Vw = Vn(x,y) * Vw(x,y) \quad (6)$$

Concealment is defined as the inverse of visibility. For example, concealment from the North is represented as shown in equation (7).

$$Cn(x,y) = 1 - Vn(x,y) \quad (7)$$

Concealment maps are combined in a similar manner to visibility maps. For example, a heuristic for concealment from the Northwest can be calculated as shown in equation (8).

$$Cnorthwest = Cn \text{ or } Cw = (Cn(x,y) + Cw(x,y))/2 \quad (8)$$

Likewise, equation (9) represents a calculation for concealment from both the North and West.

$$Cnorth \text{ and } west = Cn \text{ and } Cw = Cn(x,y) * Cw(x,y) \quad (9)$$

From the basic rules illustrated in equations (5) to (9) it is possible to build complex queries such as, finding points that have visibility to the East but concealment from the Northwest. Equation (10) is representative of a heuristic calculation for such a query.

$$\begin{aligned} Veast \text{ and } Cnorthwest &= Ve * (Cn + Cw)/2 \\ &= Ve * ((1 - Vn) + (1 - Vw))/2 \\ &= Ve * (1 - (Vn + Vw)/2) \end{aligned} \quad (10)$$

Additionally, it is possible to create compound queries that address the visibility or concealment of a small region surrounded by a larger region. In this case it is necessary to execute a number of independent queries from all sides of the small region. The information from the independent queries must then be assembled to yield query results. Heuristic visibility numbers are calculated for each point in the digital elevation map. Each of the map cells are assigned a heuristic value. The more the concealment and visibility criteria are met, the higher the heuristic value.

FIG. 6 is a flow diagram representing the process of combining heuristic visibility measures in response to a query issued by a system user. A block 110 accepts a query from the system user. As previously noted, the query will contain certain criteria of concealment of visibility. After the query has been entered, a block 120 retrieves the necessary heuristic visibility information from the system database which was built in conjunction with FIG. 2. Block 130 then performs the function of combining information from the system database in the proper fashion on a point-by-point basis for all points in the digital elevation map as previously described in connection with equation (5). In the event that a compound query has been requested, a block 140 assembles information from the independent queries. That is, block 140 performs the function of combining all compound query information for display to the user. The results of the information combination are then displayed by block 150. Note that the results as displayed by a step 140 may include a simple list of positions in the geographic area which meet the query criteria entered by the system user. Alternatively, the results may be displayed on a map which uses a gray scale or colors to denote how strongly each point on the map matches the criteria of the system user.

Accordingly, the present invention provides a system and method for rapidly determining visibility-based terrain properties over broad regions. The embodiment described herein precalculates and stores basic heuristic visibility numbers so that queries regarding concealment and visibility may be answered efficiently and quickly. Because of the speed at which queries may be handled, systems using the present method may be disposed with military personnel and may be used in surveillance or reconnaissance-type applications. Devices using the present method may also be used to determine desirable locations for cellular coverage networks. Of course, it should be understood that a range of changes and modifications can be made to the preferred embodiment described above. For example, heuristic visibility measures may be pre-computed at some central location and transmitted through wires or wireless communications media to users who could then perform queries using this data on a local processor. It is therefore intended that the foregoing detailed description be regarded as illustrative rather than limiting and that it be understood that it is the following claims, including all equivalents, which are intended to define the scope of this invention.

What is claimed is:

1. A method for determining and representing the visibility in a first direction of an array of points on a map based on a digital elevation map, the method comprising the steps of:

defining a separate visibility cone associated with each point in said array of points, each visibility cone extending in a second direction, having a number of cells and having an angle less than 180 degrees;

counting, for each point in the array of points, visible cells in said associated visibility cone that are visible;

calculating an array of heuristic visibility numbers having elements corresponding to said points in said array of points, each element of said array of heuristic visibility numbers based on said count of said visible cells in said visibility cone associated with said point corresponding to said element;

representing said visibility of said array of points on said map in said first direction with said array of heuristic visibility numbers; and storing said array of heuristic visibility numbers in a database.

2. The method of claim 1 wherein, said counting of said visible cells comprises using a ray trace technique.

3. The method of claim 1 wherein, said calculating of said array of heuristic visibility numbers comprises calculating a ratio of said count of said visible cells to said number of cells in each of said visibility cones.

4. The method of claim 1 wherein, said calculating of said array of heuristic visibility numbers comprises using an inverse square function.

5. A method for analyzing geographical locations based on a query from a user specifying desired terrain characteristics, the method comprising the steps of:

accepting an input specifying desired terrain characteristics in a fist direction from said user;

recalling previously stored terrain characteristic information from a database, said terrain characteristic information comprising an array of heuristic visibility numbers having elements representing a number of visible cells that are visible inside separate visibility cones that extend in a first direction, each visibility cone having an angle less than 180 degrees; and performing calculations using said previously stored terrain characteristic information, said calculations yielding a set of geographical locations matching said specified desired terrain characteristics in said first direction.

6. The method of claim 5 wherein, said specified desired terrain characteristics comprise visibility and concealment requirements.

7. The method of claim 5 wherein, said previously stored terrain characteristic information comprises a set of heuristic visibility information.

8. The method of claim 6 wherein, said calculations comprise calculations based on said heuristic visibility information.

9. An apparatus for determining a visibility in a first direction of an array of points on a map, said apparatus comprising:

a data processor; and a database;

said data processor accepting a set of digital elevation map information and a visibility query;

said digital elevation map information comprising a number of cells representative of elevations;

said data processor programmed to determine said visibility of said point on said map by performing the steps of:

(1) defining a separate visibility cone associated with each point in said array of points, each visibility cone extending in a second direction, having a number of cells and having an angle less than 180 degrees:

(2) counting, for each point in the array of points, visible cells in said associated visibility cone that are visible;

(3) calculating an array of heuristic visibility numbers having elements corresponding to said points in said array of points, each element of said array of heuristic visibility numbers based on said count of said visible cells in said visibility cone associated with said point corresponding to said element;

(4) representing the visibility of said array of points on said map in said first direction with said array of heuristic visibility numbers; and (5) storing said array of heuristic visibility numbers in said database.

10. The data processor of claim 9 further programmed to perform the steps of:

accepting an input specifying desired-terrain characteristics from a user;

recalling a previously stored array of heuristic visibility numbers; and performing calculations using said array of heuristic visibility numbers, said calculations yielding a set of geographical locations matching said desired terrain characteristics.

11. The method of claim 1, wherein the array of heuristic visibility numbers is a first array of heuristic visibility numbers, the method further comprising the steps of:

defining a separate visibility cone associated with each point in said array of points, each visibility cone extending in a third direction, having a number of cells and having an angle less than 180 degrees;

counting, for each point in the array of points, visible cells in said associated visibility cone that are visible;

calculating a second array of heuristic visibility numbers having elements corresponding to said points in said array of points, each element of said second array of heuristic visibility numbers based on said count of said visible cells in said visibility cone associated with said point corresponding to said element;

representing said visibility of said array of points on said map in said third direction with said second array of heuristic visibility numbers;

storing said second array of heuristic visibility numbers in a database; and combining said first array of heuristic visibility numbers with said second array of heuristic visibility numbers to determine said visibility in said first direction of said array of points on said map.

12. The method of claim 11, wherein said combining step comprises adding said elements of said first array of heuristic visibility numbers to corresponding elements of said second array of heuristic visibility numbers.

13. The method of claim 11, wherein said combining step comprises multiplying said elements of said first array of heuristic visibility numbers by corresponding elements of said second array of heuristic visibility numbers.

14. The method of claim 5, wherein the array of heuristic visibility numbers is a first array of heuristic visibility numbers and the accepting step further comprises accepting an input specifying desired terrain characteristics in a second direction, the method further comprising the step of recalling previously stored terrain characteristic information from a database, said previously stored terrain characteristic information comprising a second array of heuristic visibility numbers having elements representing a number of visible cells that are visible inside a visibility cone having an angle less than 180 degrees, wherein said step of performing calculations comprises combining said first array of heuristic visibility numbers and said second array of heuristic visibility numbers to yield a set of geographical locations matching said specified desired terrain characteristics in said first and second directions.

15. The method of claim 14, wherein said step of performing calculations comprises adding said elements of said first array of heuristic visibility numbers to corresponding elements of said second array of heuristic visibility numbers.

16. The method of claim 14, wherein said step of performing calculations comprises multiplying said elements of said first array of heuristic visibility numbers by corresponding elements of said second array of heuristic visibility numbers.

17. The data processor of claim 10, wherein said step of performing calculations comprises adding a first heuristic visibility number to a second heuristic visibility number.

18. The method of claim 1, wherein the first direction is the same as the second direction.

* * * * *